(12) United States Patent
Nordberg et al.

(10) Patent No.: US 9,351,244 B2
(45) Date of Patent: May 24, 2016

(54) PRIORITIZATION OF ENERGY OVER SYSTEM THROUGHPUT IN A WIRELESS COMMUNICATIONS SYSTEM

(75) Inventors: Mats Nordberg, Luleå (SE); Mats Folke, Luleå (SE); Sara Landström, Luleå (SE); Ghyslain Pelletier, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 371 days.

(21) Appl. No.: 13/576,081

(22) PCT Filed: Feb. 4, 2010

(86) PCT No.: PCT/SE2010/050134
§ 371 (c)(1),
(2), (4) Date: Jul. 30, 2012

(87) PCT Pub. No.: WO2011/096860
PCT Pub. Date: Aug. 11, 2011

(65) Prior Publication Data
US 2012/0307700 A1 Dec. 6, 2012

(51) Int. Cl.
*G08C 17/00* (2006.01)
*H04W 52/02* (2009.01)
(52) U.S. Cl.
CPC ............ *H04W 52/0206* (2013.01); *Y02B 60/50* (2013.01)
(58) Field of Classification Search
USPC ................ 370/254–280, 311–343, 431–445, 370/229–241; 455/418–574
See application file for complete search history.

(56) References Cited

U.S. PATENT DOCUMENTS

| 6,072,784 A * | 6/2000 | Agrawal et al. ............... 370/311 |
| 6,480,476 B1 * | 11/2002 | Willars ........................ 370/311 |
| 6,983,147 B1 * | 1/2006 | Hans et al. .................... 455/436 |

(Continued)

FOREIGN PATENT DOCUMENTS

| JP | 8503587 A | 4/1996 |
| JP | 2002528009 A | 8/2002 |
| WO | 00/22837 | 4/2000 |

OTHER PUBLICATIONS

3GPP, "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V8.8.0, Dec. 2009, 1-47.

(Continued)

*Primary Examiner* — Man Phan
(74) *Attorney, Agent, or Firm* — Murphy, Bilak & Homiller, PLLC

(57) ABSTRACT

The present invention relates to a user equipment and a radio base station, and to related methods of enabling the radio base station to affect an energy saving in the system during a connection between the user equipment and the radio base station according to a priority level of the energy saving. The method comprises the step of detecting (210) a trigger received via a user interface of the user equipment, where the trigger is associated with the priority level of the energy saving in the system. It also comprises transmitting (220) an indicator of the priority level to the radio base station, allowing the radio base station to affect the energy saving in the system during the connection according to the priority level, by configuring different user or system related parameters.

40 Claims, 6 Drawing Sheets

(56) References Cited

U.S. PATENT DOCUMENTS

| | | | |
|---|---|---|---|
| 7,260,080 B2* | 8/2007 | Suumaki et al. | 370/342 |
| 7,324,468 B2* | 1/2008 | Fischer | 370/311 |
| 7,433,334 B2* | 10/2008 | Marjelund et al. | 370/329 |
| 7,460,475 B2* | 12/2008 | Tourunen et al. | 370/230.1 |
| 7,500,119 B2* | 3/2009 | Tsai | 713/300 |
| 8,005,453 B2* | 8/2011 | Van Bosch et al. | 455/343.2 |
| 8,107,378 B2* | 1/2012 | Hsu et al. | 370/236 |
| 8,121,656 B2* | 2/2012 | Imai | 455/574 |
| 8,264,995 B2* | 9/2012 | Winterton | 370/311 |
| 8,351,848 B2* | 1/2013 | Mohanty et al. | 455/11.1 |
| 8,699,997 B2* | 4/2014 | Mildh et al. | 455/410 |
| 8,848,653 B2* | 9/2014 | Edge et al. | 370/331 |
| 8,902,830 B2* | 12/2014 | Nimbalker et al. | 370/329 |
| 8,937,878 B2* | 1/2015 | Pollanen et al. | 370/252 |
| 8,989,757 B2* | 3/2015 | Barta et al. | 455/452.1 |
| 2007/0167195 A1* | 7/2007 | Su et al. | 455/574 |
| 2009/0088195 A1* | 4/2009 | Rosa et al. | 455/507 |
| 2009/0093281 A1* | 4/2009 | Demirhan et al. | 455/574 |
| 2010/0103849 A1* | 4/2010 | Wang et al. | 370/311 |
| 2010/0112960 A1* | 5/2010 | Shao et al. | 455/73 |
| 2012/0213139 A1* | 8/2012 | Zee et al. | 370/311 |
| 2012/0289224 A1* | 11/2012 | Hallberg et al. | 455/424 |

OTHER PUBLICATIONS

3GPP, "3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.8.0, Dec. 2009, 1-206.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 8)", 3GPP TS 23.401 V8.8.0, Dec. 2009, 1-235.

Unknown, Author, "UTRA Node B energy saying", Ericsson, ST-Ericsson, 3GPP TSG RAN WG1 Meeting #59bis R1-100598, Valencia, Spain, Jan. 18-22, 2010, 1-5.

* cited by examiner

PRIORITIZATION OF ENERGY OVER SYSTEM THROUGHPUT IN A WIRELESS COMMUNICATIONS SYSTEM

The present invention relates to energy saving prioritizations in a wireless communications system. More particularly, the present invention relates to a radio base station, a user equipment and a method of affecting the energy saving in the system during a connection between the user equipment and the radio base station according to an energy saving priority level determined by the user.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS and evolved UTRAN (E-UTRAN) is the radio access network of an LTE system. In an E-UTRAN, a user equipment (UE) 150 is wirelessly connected to a radio base station (RBS) 110a-c commonly referred to as an eNodeB (eNB), as illustrated in FIG. 1a. The eNBs 110a-c are directly connected to the core network (CN) 190 via the S1 interface. In UTRAN however, the radio base stations or NodeBs (NB) are connected to the CN via a Radio Network Controller (RNC) which controls the NBs connected to it.

The trend in the evolution of wireless access technologies is a continuously increased capacity, but also higher complexity in order to meet the tougher throughput and delay requirements. Coordinated multipoint transmission/reception (COMP), where signals are simultaneously and coherently transmitted/received from/to multiple RBSs to improve performance, and multiple-input multiple-output (MIMO), where the performance is improved as both the transmitter and the receiver are equipped with multiple antennas, are two examples of elements in LTE that help reaching high throughputs. However these elements may also increase the energy consumption in the system.

The focus on sustainability and energy consumption in telecommunications systems is increasing. In 3GPP LTE technology, most energy is consumed during the phase when the eNB is in operation. Thus, methods for reducing the energy consumption for deployed eNBs are important. In prior art, the communications system strives to offer each user the best possible quality of service (QoS) within the frame of the user's subscription, and the radio resource management algorithms prioritize highest possible throughput and lowest possible delay and packet loss. This often means spending more energy than strictly necessary to transfer the data.

An environmental friendly user of e.g. an E-UTRAN may, at least in some situations or for some connections, accept a lower throughput or longer delay e.g. if that would reduce the energy consumption in the system. However, a problem in the current 3GPP standards is that there is no possibility to differentiate the trade off between energy saving and throughput, and all UEs are prioritizing throughput in the same way.

SUMMARY

The object of the present invention is to address some of the problems and disadvantages outlined above, and to allow for a change of the prioritization of energy saving in the wireless communications system during a connection between the user equipment and a radio base station. This would allow affecting the energy saving in the system during the connection according to the prioritization. This object and others are achieved by the methods and devices according to the independent claims, and by the embodiments according to the dependent claims.

In accordance with a first aspect of the present invention, a method for a user equipment in a wireless communications system, of enabling a radio base station to affect an energy saving in the system during a connection between the user equipment and the radio base station according to a priority level of the energy saving is provided. The method comprises the step of detecting a trigger received via a user interface of the user equipment. The trigger is associated with the priority level of the energy saving in the system. The method also comprises the step of transmitting an indicator of the priority level to the radio base station, allowing the radio base station to affect the energy saving in the system during the connection according to the priority level.

In accordance with a second aspect of the present invention, a method for a radio base station in a wireless communications system, of affecting an energy saving in the system during a connection between a user equipment and the radio base station according to a priority level of the energy saving is provided. The method comprises the steps of retrieving an indicator of the priority level of the energy saving in the system, and configuring a parameter affecting the energy saving in the system during the connection according to the indicated priority level.

In accordance with a third aspect of the present invention, a user equipment configured to be used in a wireless communications system and to enable a radio base station to affect an energy saving in the system during a connection between the user equipment and the radio base station according to a priority level of the energy saving, is provided. The user equipment comprises a detecting unit adapted to detect a trigger received via a user interface of the user equipment. The trigger is associated with the priority level of the energy saving in the system. The user equipment also comprises a transmitter adapted to transmit an indicator of the priority level to the radio base station, allowing the radio base station to affect the energy saving in the system during the connection according to the priority level.

In accordance with a fourth aspect of the present invention, a radio base station configured to be used in a wireless communications system and to affect an energy saving in the system during a connection between a user equipment and the radio base station according to a priority level of the energy saving is provided. The radio base station comprises a retrieving unit adapted to retrieve an indicator of the priority level of the energy saving in the system, and a configuring unit adapted to configure a parameter affecting the energy saving in the system during the connection according to the indicated priority level.

In accordance with a fifth aspect of the present invention, a method for a user equipment in a wireless communications system, of affecting an energy saving in the system during a connection between the user equipment and a radio base station according to a priority level of the energy saving. The method comprises the step of detecting a trigger received via a user interface of the user equipment. The trigger is associated with the priority level of the energy saving in the system. The method also comprises the step of configuring a user equipment related parameter affecting the energy saving in the system during the connection according to the priority level.

In accordance with a sixth aspect of the present invention, a user equipment configured to be used in a wireless communications system, and to affect an energy saving in the system during a connection between the user equipment and a radio base station according to a priority level of the energy saving, is provided. The user equipment comprises a receiver adapted to receive a trigger via a user interface of the user equipment. The trigger is associated with the priority level of the energy saving in the system. The user equipment also comprises a configuring unit, adapted to configure a user equipment related parameter affecting the energy saving in the system during the connection according to the priority level.

An advantage of embodiments of the present invention is that a user may indicate how the energy saving in the system should be prioritized in relation to the connection performance during a specific connection. This would allow the network to implement mechanisms that save energy in accordance with what the user equipment has indicated, instead of prioritizing QoS regardless of the energy consumption as in prior art.

Furthermore, an advantage of embodiments of the present invention is that they allow a user in a wireless communications system to make an active choice to be environmental friendly in a flexible way, e.g. via the user interface of the user equipment, thereby supporting a decrease of the system energy consumption from a wider perspective than just the user's own battery consumption.

Still another advantage of embodiments of the present invention is that they allow for feeding back information to the user equipment regarding the actual energy saving during the connection.

A further advantage of embodiments of the present invention is that they allow the user to start with one prioritization of the energy saving in relation to the connection capacity during a connection, and to change the prioritization during the same connection if needed.

A further advantage of embodiments of the present invention is that they allow the user equipment to control activities, such as the choice of UE capability or radio access technology, which affect the system wide energy consumption.

DETAILED DESCRIPTION

Figure 1A:
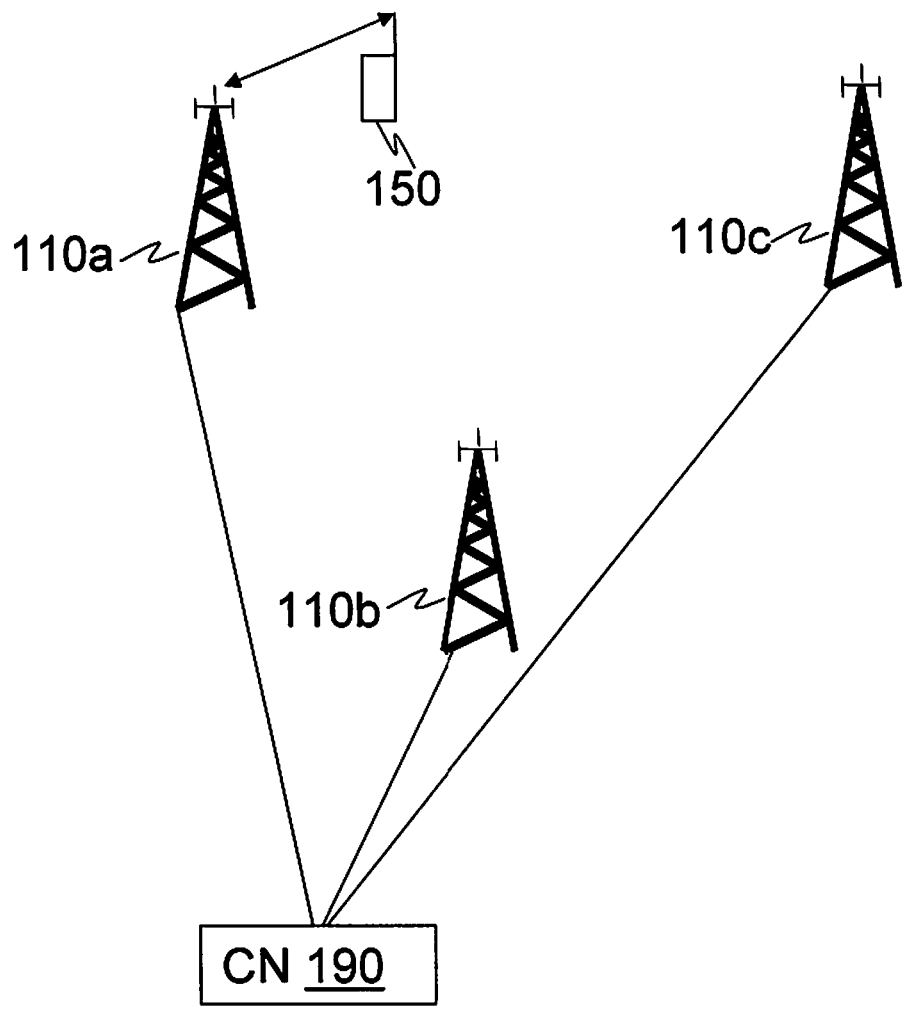
FIG. 1a illustrates schematically a part of a conventional wireless communication system wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular embodiments of the invention are described in a non-limiting general context in relation to an E-UTRAN. It should though be noted that the invention and its exemplary embodiments may also be applied to other types of radio access networks such as UTRAN, WiMax and GSM.

If it would be possible for a user to make an active choice to be environmental friendly when communicating through a radio access network, which could e.g. mean trading connection throughput for energy savings in the network, this would help to decrease the network energy consumption from a wider perspective than just the user's own battery consumption. Although there is functionality in the network that can reduce the UE's battery consumption such as discontinuous reception (DRX), there is currently no way to allow e.g. a different DRX parameter setting for a specific UE when the user of the UE wants to prioritize energy savings more than the default DRX settings allow. It is not possible to distinguish a user that prioritizes energy saving in relation to e.g. throughput, and therefore it is of no use to implement mechanisms in the network that allows for different prioritization of energy saving versus throughput.

In embodiments of the present invention, the problem of not being able to take into account the users' preferences of energy saving in a wireless communication system, and thereby allowing for a trade off between energy saving and performance, is addressed by a solution where the users' prioritization of energy saving in relation to other QoS parameters for a connection, such as throughput, delay, packet loss rate, and the priority of the UE (i.e. the priority when it comes to admission control and scheduling for the UE connection e.g.) is signaled from the user equipment (UE) to the eNBs. This allows the eNBs to tune parameter settings and radio resource management algorithms in line with the users' prioritization, and thus to affect the energy consumption in the system in different ways for different UE connections.

According to embodiments of the present invention, the eNB retrieves an indicator of how the UE wants to prioritize energy saving in the system during a connection, i.e. an indicator of a priority level, and configures a parameter that affects the energy saving in the network during the connection according to the indicated priority level. The prioritization of the energy saving may be a binary setting with two possible priority levels. One priority level may indicate a high priority of the energy saving, thus corresponding to the environmental friendly, or "green" choice of the user, and the other priority level may indicate that energy saving is not prioritized, which thus corresponds to the "normal" case. Alternatively, there may be more than two priority levels defined. Each priority level may indicate a certain priority of the energy saving in relation to e.g. the throughput, and/or delay, and may correspond to different configurations of parameters performed by the eNB. The different eNB parameter configurations may thus affect the energy saving in different ways according to the relevant priority level. For instance at a first priority level, corresponding to a somewhat higher priority level of the energy saving than in the "normal" case, the DRX parameter may be configured by the eNB to somewhat reduce the energy consumption at the expense of capacity or delay. For the following priority levels, each one corresponding to an increased priority of the energy saving in relation to the connection performance, an additional parameter may be configured by the eNB in order to increase the energy savings at the expense of performance such as throughput, delay, priority of the UE, and/or packet loss rate. Both the UE and the network can use this scale of priority levels to indicate the trade-off between energy saving and performance that they are currently making in their communication.

There are several parameters that may be configured by the eNB to affect the energy saving in the system. The parameters may be UE related, such as parameters for DRX, QoS, paging, Channel Quality Information (CQI), Uplink Power Control (ULPC), Dedicated scheduling request (D-SR), Timing Adjustment Interval (TAI), measurement reports, and/or Physical Uplink Control Channel (PUCCH) resources etc., and/or they may be system related, such as the DTX parameters, scheduling parameters, and thresholds for the activation of measurements, carrier aggregation (allowing a UE to simultaneously receive and/or transmit over multiple carriers which leads to a manifold increase in the data rate), COMP, MIMO, or activation of additional radio base stations, antennas, or relays/repeaters. If e.g. the eNB changes the user related QoS settings for a connection, such that the QoS requirements are lowered in accordance with the energy saving priority level that the UE has indicated, the total capacity that the system needs to provide will be reduced. This in turn allows complex and energy consuming algorithms, radio base stations, and relays e.g. to be inactivated, which will thus affect the system wide energy consumption. Another possibility is to change the system related thresholds and triggers for activating algorithms and network parts such as radio base stations and relays. A higher threshold for the activation would also allow a higher energy saving at the expense of the connection performance. Parameters such as scheduling resource intervals, and DTX parameters affects directly the delay of the connection, and what RAT that is used may also indirectly affect the delay. The amount of used radio base stations, antennas and relays, which is dependent on the thresholds for activation of such extra resources, will rather affect the throughput.

As already described above, the eNB retrieves an indicator of how the UE wants to prioritize energy saving in the system during a connection. The indicator might be retrieved from the UE, as in the first and second embodiments described below. In these embodiments it is the UE that transmits an indicator of the priority level to the eNB either during initial access, or after initial access when the UE is in connected mode. The UE transmits the indicator when it detects a trigger associated with the priority level, received via the user interface (UI) of the UE. The user is thus able to easily trigger the energy saving prioritization through the UI of the UE in these embodiments. The users choice of priority level for the energy saving could for example be made by pushing a button on the UI, where the button represents the "green" option of prioritizing energy saving higher than connection performance such as throughput. Alternatively, the user's choice may be done via a menu based UI, or by adding for instance a star symbol to the end of the phone number before pressing the dial button.

Figure 1B:
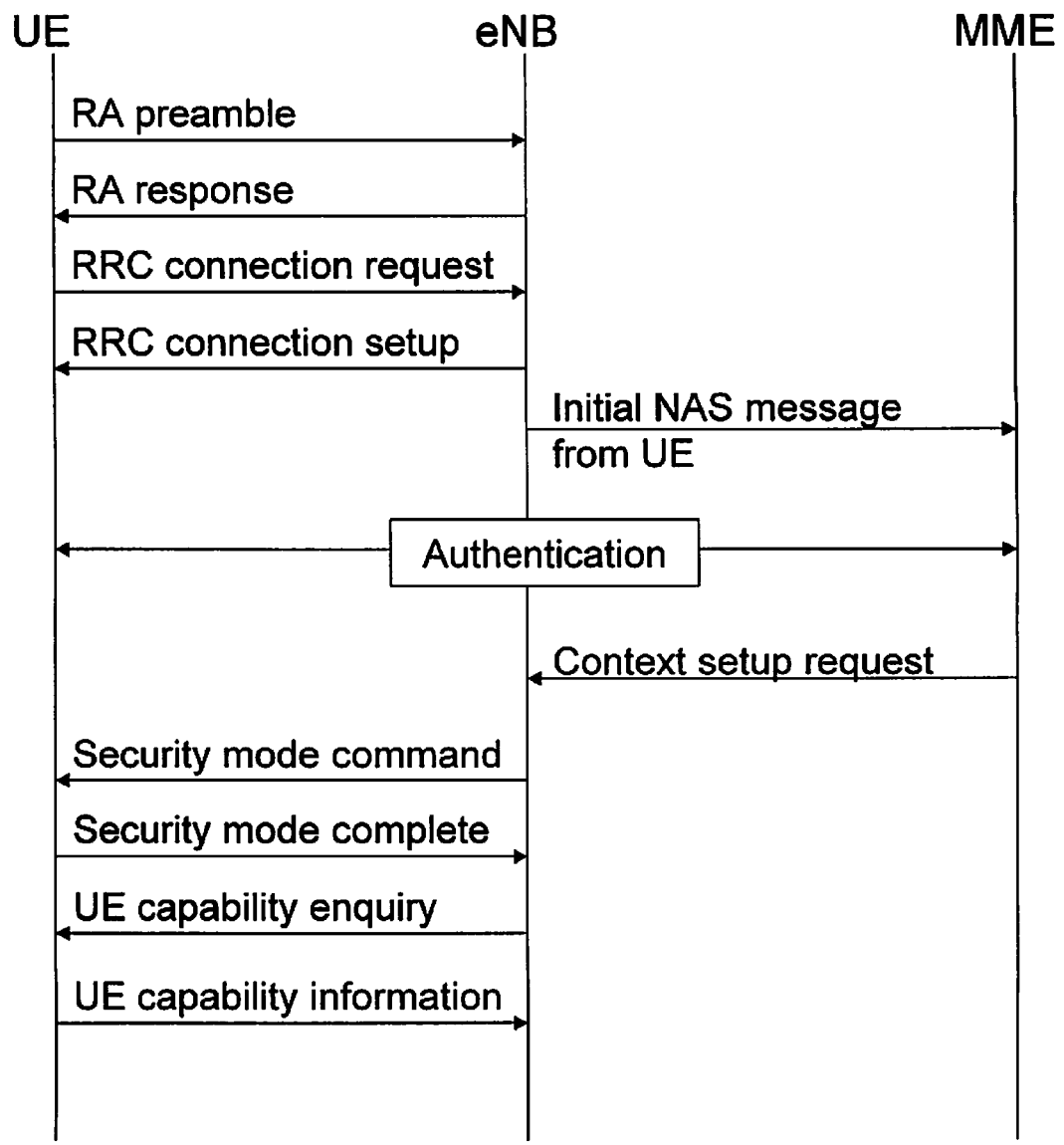
FIG. 1b illustrates schematically the steps traversed during initial access before the radio bearer is setup and user plane data can be exchanged, according to prior art.

In the first embodiment of the present invention, the indicator is retrieved from the UE during initial access of the connection. The advantage of receiving the indication early, as in this embodiment, is that it makes network management decisions efficient. FIG. 1*b* illustrates the different steps of the initial access procedure that a user initiates when it is in idle mode and wants to become connected. The steps comprise random access, authentication, and transfer of UE capabilities, and are followed by the setup of a Data Radio Bearer, ORB and a change from idle to connected mode for the UE.

There are two alternatives for the UE to transmit the energy saving priority indicator to the eNB in this first embodiment, i.e. during initial access:
1. The indicator may be transmitted when performing random access (RA). The RA serves as an uplink control procedure to enable the UE to access the network. Since the initial access attempt cannot be scheduled by the network, the RA procedure is by definition contention based. The UE transmits the RA preamble in order to obtain uplink synchronization prior to any transmission of user data. One alternative may therefore be to reserve certain time slots or frequency or code resources for the indication of the priority level. Alternatively parts of the RA preamble number space may be used.
2. The indicator may be transmitted during the transfer of UE capabilities in the initial access. One alternative is to create a new UE capability for the priority level of the energy saving. This UE capability may then be transmitted to the eNB in a UE capability message, thus indicating the priority level.

In a second embodiment of the present invention, the indicator is retrieved from the UE after initial access, i.e. when the UE is in connected mode and a DRB has been set up.

The advantage of this embodiment is that it allows the user to change its energy saving priority when the connection has already been set up. There are four alternatives for how to indicate the priority level in this second embodiment:
1. A first alternative is to create a new Medium Access Control (MAC) control element, i.e. a new element in the MAC header, which will indicate the UE's priority level. Several code points can be allowed in the MAC control element, which will allow for more than two priority levels.
2. A second alternative is to use a scheduling request (SR) to indicate a priority level. A UE that wants to initiate uplink transmission must first request uplink resources by transmitting an SR on the Physical Uplink Control Channel (PUCCH). The eNB will select the resource blocks to be assigned to the user and will return a scheduling grant (SG). Once the UE has received the SG it can start uplink data transmission on the assigned uplink resources. It may e.g. be possible to use time division for the SR PUCCH resources, such that sending an SR in one slot may indicate a high priority of the energy saving, and sending an SR in another slot may indicate no priority of the energy saving. If e.g. four different priority levels of the energy saving is preferred, every fourth time slot may be interpreted as one specific priority level. It is thus implicitly understood that the first PUCCH resource after the network allocation corresponds to energy level 0 and the next to energy level 1, etc. A UE that does not prioritize energy savings can send in all time slots. An alternative solution is to reserve two bits for the SR, where one code point could be reserved for the indicator of the energy saving priority level. With this alternative, the energy saving can only be turned on and off, as there are only two possible priority levels.

3. A third alternative is to use the buffer status report (BSR) to indicate a preferred priority level. Buffer status reporting is used by the UE to report to the eNB the amount of data stored in its buffers for transmission. The eNB uses these reports to allocate resources to the UE, and to prioritize resource allocation between different UEs. The UE triggers a regular BSR when uplink data becomes available for transmission and if this data belongs to a logical channel group (LCG) with higher priority than those for which data already existed in the buffer, or if the UE buffers were empty just before this new data became available for transmission. One possibility for the indication of priority level, is thus to couple a certain LCG to an energy saving priority level. When this energy saving priority level is triggered in the UE, a BSR indicating that data has arrived for this LCG will thus implicitly indicate the corresponding energy saving priority level. This embodiment allows for two or more priority levels.

4. A fourth alternative is to use a QoS parameter such as a QoS class identifier (QCI) to indicate the priority level of the energy saving. After initial access, the UE may request that the radio bearer should be modified and may suggest other QoS settings to be used. Some of the QCI values are predefined, but it is possible to define a number of new QCI values to implement one or several energy saving levels.

In an embodiment of the present invention applied to a GSM system or UMTS, the priority level may be indicated in a radio resource control (RRC) connection establishment, in a temporary block flow establishment, or in a packet data control (PDP) context activation.

In the first and second embodiment described above, the indicator is thus retrieved from the UE, or rather transmitted from the UE to the eNB sometime during or after initial access, when the UE receives a user initiated trigger. However, a user may choose to have an energy saving subscription for its UE, in order to be environmental friendly by default. The advantage of this embodiment is that the user will not need to trigger the priority level of the energy saving for each connection. The indicator may thus, in a third embodiment of the present invention, be retrieved from a node in the network instead of from the UE. The user is more or less locked to this commitment, and the UE context may provide information about the UE energy saving priority level. The eNB thus retrieves a UE subscription parameter that indicates the energy saving priority level from a network node during initial access, instead of from the UE.

From a network point of view, it may be beneficial if the user is not allowed to switch back and forth between different priority levels too often while actively communicating. However, as the energy saving preference of the users may change over time, users should have the possibility to modify the energy saving priority level at least on a transfer, session or connection granularity. It may e.g. be crucial for a user to retrieve a certain document as fast as possible while sitting in a meeting, whereas at another point in time downloading the same document for later use makes it possible for the user to accept longer download times in favor of energy savings.

In one fourth embodiment of the present invention, it may thus be possible to let a user with an environmental friendly subscription that supports high priority of the energy saving by default, to switch to low priority at initial access, using similar mechanisms as the ones described for the first embodiment above (i.e. transmitting an indicator using RA preamble or UE capability). Alternatively, a user with a "normal" non-environmental friendly subscription, may indicate a first priority level during initial access (similarly to the first embodiment above using RA preamble or UE capability for the indication), but may then indicate a changed priority level during the connection, using similar mechanisms as described in second embodiment above (new MAC control element, the SR, the BSR, or a QoS parameter).

In an example of the fourth embodiment described above, the UE may detect a first trigger associated with e.g. high priority of the energy saving, and will therefore transmit an indicator of the high priority to the eNB, e.g. by using the RA preamble during initial access, which will allow the eNB to act accordingly e.g. by configuring a threshold for activating MIMO enabling a lower throughput and a lower energy consumption. The UE may subsequently detect a second trigger during the same connection, associated with another priority level of the energy saving in the system, e.g. no priority of the energy saving, and will thus during the same connection transmit a second indicator to the eNB which will enable the system to switch back to "normal" mode, where connection performance is prioritized regardless of the energy consumption. The eNB will receive this second priority level indicator, e.g. in a scheduling request, and may thus reconfigure the threshold for instance activating MIMO in order to prioritize high throughput instead of low energy consumption.

In still another embodiment of the present invention, information about how much energy that has been saved during the connection may be transmitted from the eNB to the UE. The advantage of this is embodiment is to let the users know how much energy they have saved. Direct feedback after a call with an estimate of the energy saving through SMS is one way to implement this embodiment. Another is to report once a week or once a month, or to make the statistics available on the phone so that the user can see its current energy saving.

In a further embodiment of the present invention, the UE may itself—when it receives a trigger associated with a priority level, i.e. when it is triggered by a user to prioritize energy saving—configure a UE related parameter in order to affect the energy saving in the system during the connection according to the priority level associated with the trigger. One parameter that the UE could use to reduce energy consumption, is the UE capability. The UE may state that it is compatible with another LTE release than it actually is (for instance being compatible with LTE release 8 instead of its actual LTE release 10, if LTE 8 is more energy efficient than LTE 10), by indicating that it belongs to another UE capability group than it actually does. Another UE capability parameter that the UE may configure to allow for energy savings in the network, is the supported RAT parameter. It may e.g. exclude certain RATs from its list of supported RATs, to avoid using energy consuming RATs.

Figure 2A:
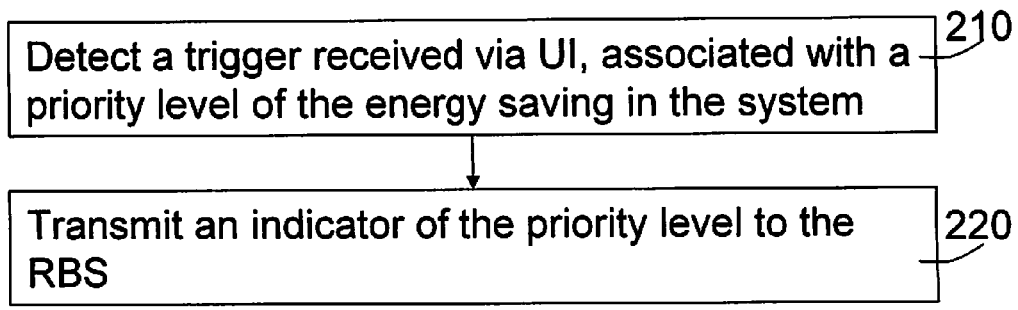
FIGS. 2a-b are flowcharts of the method performed by the user equipment according to embodiments of the present invention.

FIG. 2a is a flowchart of the method performed by the UE according to embodiments of the present invention. The method comprises the following steps:

210: Detecting a trigger associated with the priority level of the energy saving in the system. The trigger is received via a UI of the UE, and may e.g. correspond to trigger generated when the user of the UE is pushing a button on the UI, where the button represents the "green" option of prioritizing energy saving higher than connection performance such as throughput. The user may e.g. trigger a new prioritization of the energy saving before the set up of a new connection, but it may also be done during a connection.

220: Transmit an indicator of the priority level to the radio base station. This is performed to allow the radio base station to affect the energy saving in the system during the connection according to the priority level. In the first embodiment described above, the indicator is transmitted during initial access of the connection, and the priority level may be indicated in either a RA preamble or in a UE capability message. This may be used when the user has triggered the new priority level before or at the same time as a connection is set up. In the second embodiment described above, the indicator is transmitted after initial access, and the priority level may be indicated in either a new MAC control element, an SR resource, a BSR, or a QoS parameter. This alternative is used when the user has triggered the new prioritization during a connection.

Figure 2B:
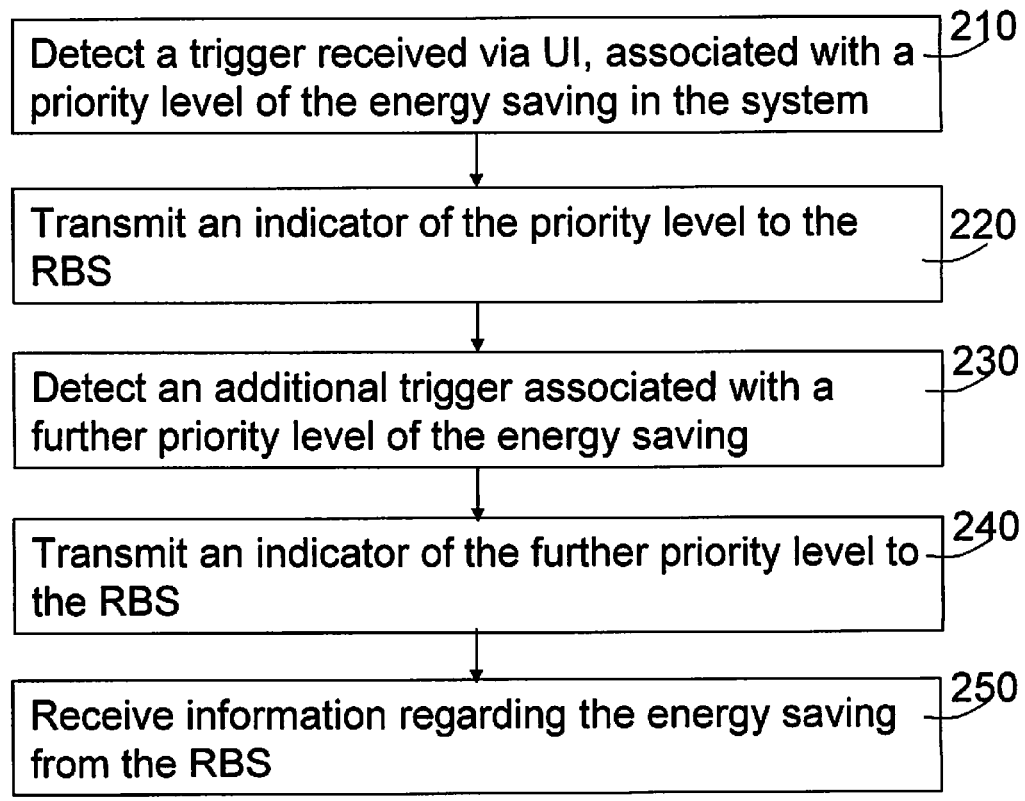

FIG. 2b is a flowchart of the method performed by the UE according to another embodiment of the present invention, where the method comprises the following steps in addition to steps 210 and 220 described with reference to FIG. 2a:

230: Detecting an additional trigger associated with another priority level of the energy saving in the system than the previous priority level triggered in step 210. The additional trigger is also received via a UI of the UE.

240: Transmit an indicator of the new priority level to the radio base station, in order for the radio base station to affect the energy saving according to the new priority level. In this embodiment, the user may start with a first priority level, triggered e.g. at connection set up in step 210. At a later stage during the connection, the user either wants to step up the priority level of the energy saving in order to be more environmental friendly at the expense of e.g. throughput, or the user wants to step back to a less energy saving priority level, e.g. because he suddenly needs better throughput.

250: The UE may receive feedback information regarding how much energy that has been saved in the system during the connection from the radio base station.

The amount of priority levels may be either two, or more than two. In both cases, the first level is the "no priority" level, indicating that the energy saving should not be prioritized, and the connection should be handled in the "normal" way, thus meaning that connection performance is prioritized regardless of the energy consumption. The next level could either be a "high priority" level, or there could be several priority levels to indicate different levels of energy saving in relation to the connection performance, such as the connection throughput, delay, priority and/or packet loss rate, as described above.

Figure 3A:
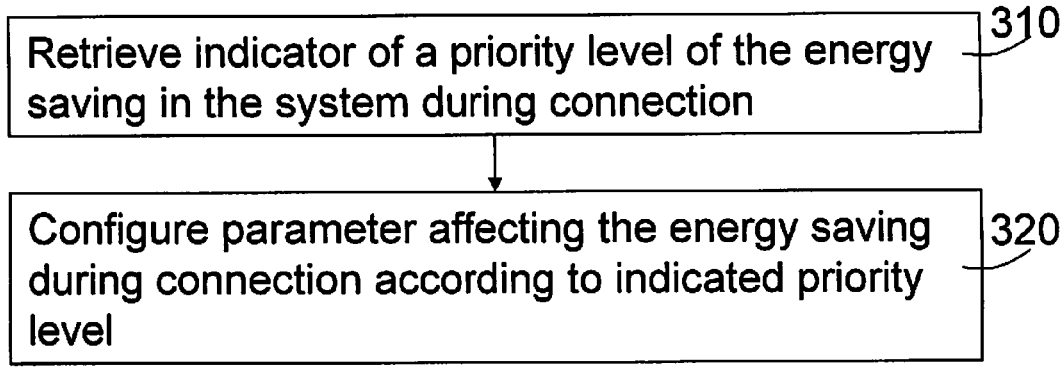
FIGS. 3a-b are flowcharts of the method performed by the radio base station according to embodiments of the present invention.

FIG. 3a is a flowchart of the method performed by the eNB according to embodiments of the present invention. It comprises the following steps:

310: Retrieve an indicator of the priority level of the energy saving in the system during the connection. In the first and second embodiments described above, it is the UE that transmits the indicator to the eNB. This is also described with reference to FIG. 2a above. In the third embodiment described above, the eNB retrieves the indicator from a network node that stores subscriber data for the UEs. The priority level is indicated in a subscription parameter retrieved by the eNB during initial access, when the user has chosen an energy saving subscription for its UE.

320: Configure a parameter affecting the energy saving in the system during the connection according to the indicated priority level. If there are more than two priority levels, each priority level may be coupled to the configuration of a certain parameter. The parameters may be UE related, such as the DRX parameters, and the QoS parameters, and/or they may be system related, such as the DTX parameters, scheduling parameters, and thresholds for the activation of measurements, carrier aggregation, COMP, MIMO, or activation of additional radio base stations, antennas, or relays/repeaters.

Figure 3B:
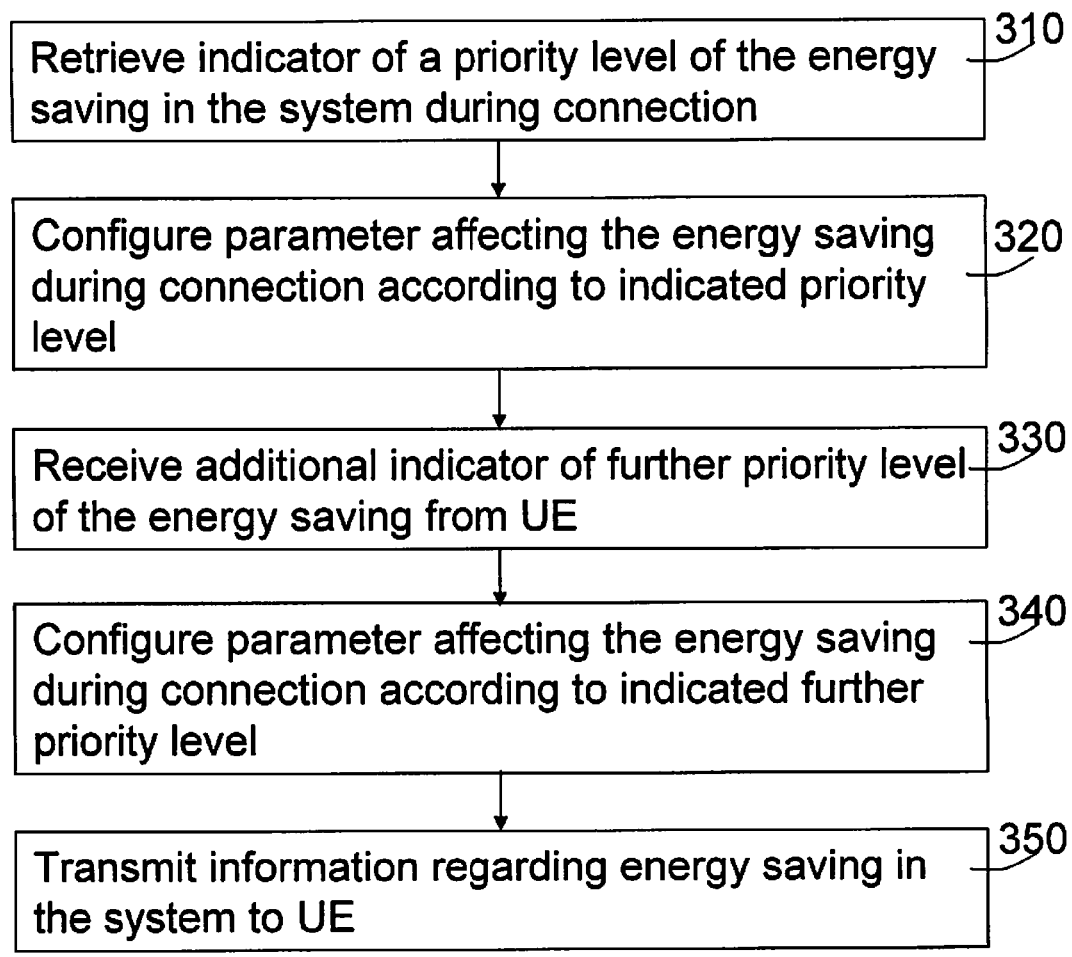

FIG. 3b illustrates schematically the method of the network node according to another embodiment of the present invention. In this embodiment the method comprises the following steps in addition to steps 310 and 320 described with reference to FIG. 3a:

330: Receive an additional indicator of a further priority level of the energy saving in the system during the connection, from the UE. The user has triggered that he wants to change to a new priority level. This step corresponds to step 240 described above. In another exemplary embodiment than the one described in step 240, the eNB may retrieve a first indicator of a first priority level from a network node, which is the case when the UEs subscription decides the "default" priority level for this UE. The user may then trigger that he would not like to prioritize energy saving during a call, e.g. because he suddenly needs better throughput, and the eNB will then receive a second indicator of a new priority level from the UE.

340: Configure the parameter affecting the energy saving in the system during the connection according to the indicated new priority level. The same list of possible parameters as mentioned above in step 320 may be configured.

350: Transmit information regarding the energy saving in the system during the connection, to the UE. This step corresponds to step 250 in the UE described above.

Figure 4:
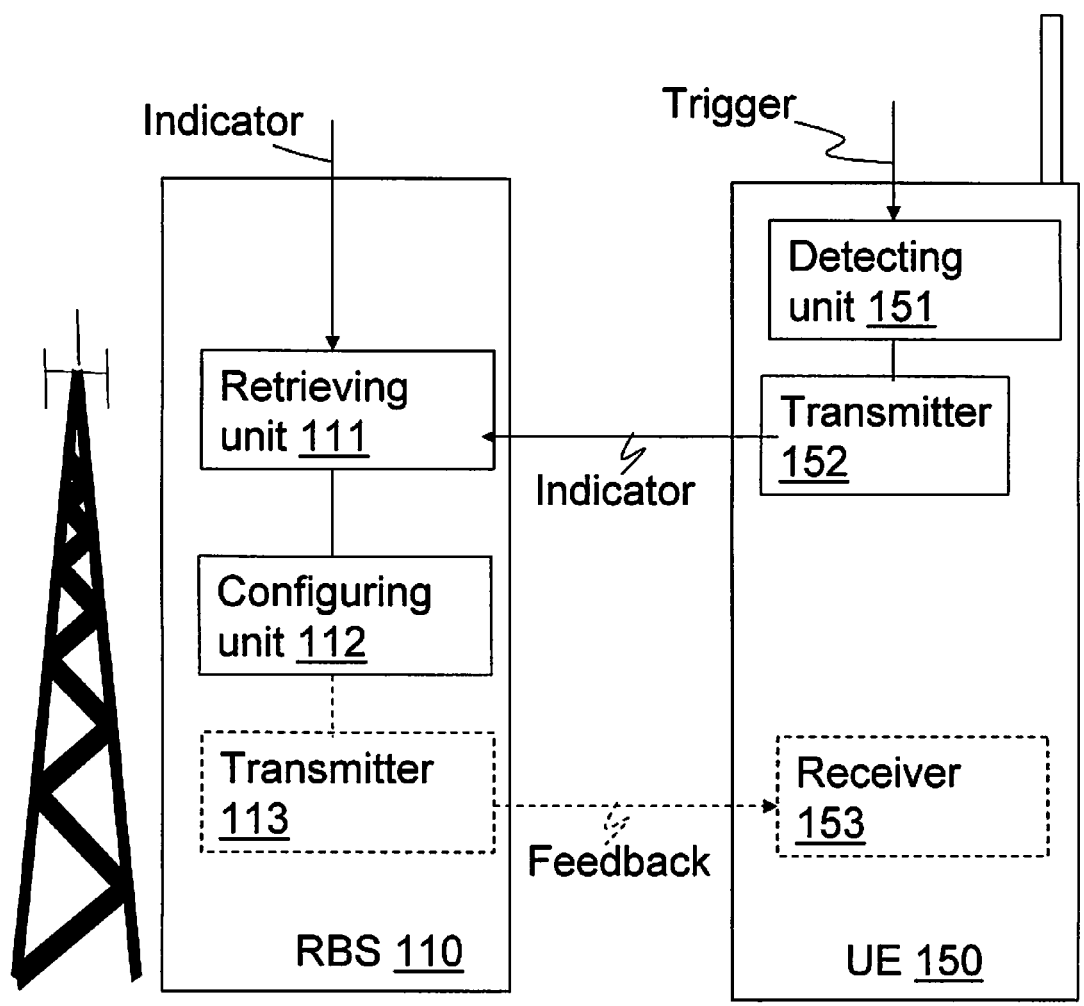
FIG. 4 illustrates schematically a radio base station and a user equipment according to embodiments of the present invention.

Schematically illustrated in FIG. 4 and according to embodiments of the present invention, is the eNB 110 and the UE 150. The UE 150 comprises a detecting unit 151, adapted to detect the trigger received via a UI of the UE. The trigger is associated with the priority level of the energy saving in the system, that the user wants. The UE 150 also comprises a transmitter 152 adapted to transmit the indicator of the priority level to the eNB 110. The transmission of the indicator to the eNB will allow the eNB to affect the energy saving in the system during the connection according to the priority level. The transmitter 152 may be adapted to transmit the indicator to the eNB during or after initial access, as described above. The detecting unit 151 may be further adapted to detect an additional trigger of a new priority level of the energy saving, where the additional trigger is received via a UI of the UE. In that case the transmitting unit 152 is further adapted to transmit an indicator of the further priority level to the radio base station, allowing the radio base station to further affect the energy saving in the system during the connection according to the further priority level. The user may thus change its prioritization during the connection in this embodiment. Furthermore, the UE may comprise a receiver 153 adapted to receive information regarding the energy saving in the system during the connection, from the radio base station.

The eNB 110 comprises a retrieving unit 111 adapted to retrieve the indicator of the priority level of the energy saving in the system during the connection, and a configuring unit 112 adapted to configure a parameter affecting the energy saving in the system during the connection according to the indicated priority level. The indicator may be received from the UE during or after initial access, as described in the first and second embodiment above. During initial access the RA preamble or a UE capability message may be used to indicate the priority level. After initial access, the priority level may be indicated in a MAC control element, a scheduling request, a buffer status report, or a quality of service parameter. The indicator may also be retrieved from a network node during initial access, as described above in the third embodiment. The receiver 111 may be further adapted to receive an additional indicator of another priority level of the energy saving in the system during the connection, from the UE. In this case the configuring unit 112 is further adapted to configure the parameter affecting the energy saving in the system during the connection according to the indicated further priority level. The parameter that the eNB configures may be a UE related parameter and/or a system related parameter. The UE related parameter may be one or more of a DRX parameter, and a QoS parameter. The system related parameter may be one or more of a DTX parameter, or a threshold for activating algorithms, additional radio base stations, antennas, or relays. The eNB 110 may also comprise a transmitter 113 adapted to transmit information regarding the energy saving in the system during the connection, to the UE.

Figure 5A:
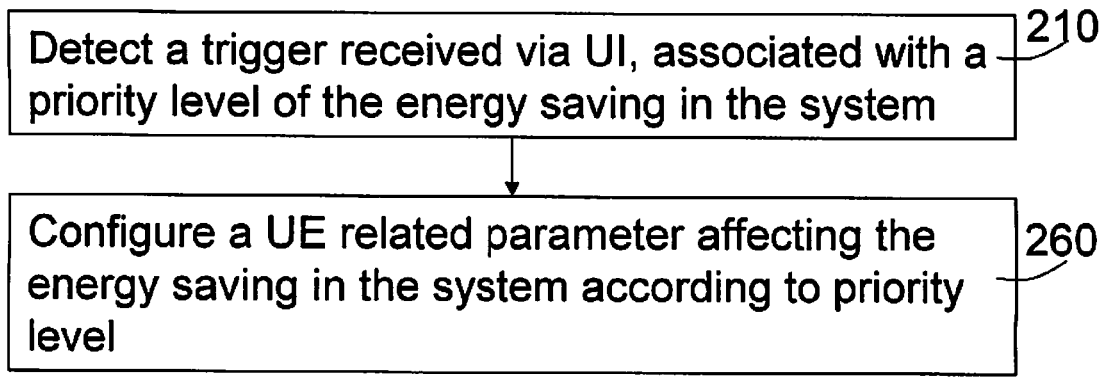
FIG. 5a is a flowchart of the method performed by the user equipment according to embodiments of the present invention.

FIG. 5a is a flowchart of the method performed by the UE according to embodiments of the present invention. The method comprises the following steps:

210: Detect a trigger received via a UI of the UE, where the trigger is associated with the priority level of the energy saving in the system. This is the same step as described above with reference to FIG. 2a.

260: Configure a UE related parameter affecting the energy saving in the system during the connection according to the priority level. In this embodiment, the UE may itself configure a parameter that will affect the energy saving in the system. The UE related parameter may be a UE capability parameter, such as a parameter related to supported radio access technologies.

Figure 5B:
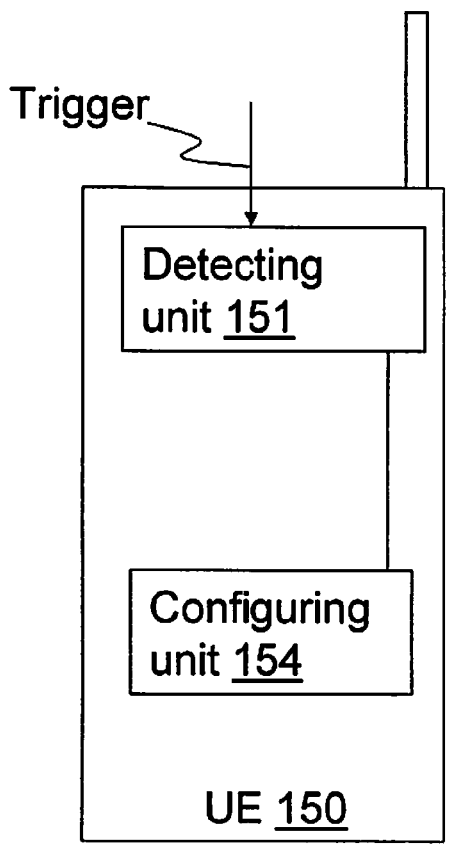
FIG. 5b illustrates schematically a user equipment according to embodiments of the present invention.

FIG. 5b illustrates schematically a UE according to embodiments of the present invention. The UE 150 comprises a receiver 151 adapted to receive a trigger via a UI of the UE, as described above with reference to FIG. 3a. It also comprises a configuring unit 154, adapted to configure a UE related parameter affecting the energy saving in the system during the connection according to the priority level.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

3GPP 3rd Generation Partnership Program
BSR Buffer Status Report
CN Core Network
COMP Coordinated Multipoint (transmission/reception)
DRB Data Radio Bearer
DRX Discontinuous Reception
DTX Discontinuous Transmission
eNB evolved Node B
E-UTRAN Evolved UTRAN
LCH Logical Channel
LCG Logical Channel Grouping
LTE Long Term Evolution
MAC Medium Access Control
MIMO Multiple Input Multiple Output
MME Mobility Management Entity
NAS Non Access Stratum
NB NodeB
PUCCH Physical Uplink Control Channel
QCI QoS Class Identifier
QoS Quality of Service
RA Random Access
RAN Radio Access Network
RAT Radio Access Technologies
RBS Radio Base Station
RNC Radio Network Controller
SG Scheduling Grant
SR Scheduling Request
UE User Equipment
UMTS Universal Mobile Telecommunications System
UTRAN Universal Terrestrial RAN

The invention claimed is:

1. A method, in a user equipment in a wireless communications system that comprises a radio access network and one or more user equipments, for enabling a radio base station to effect energy savings in the wireless communications system during a connection between the user equipment and the radio base station according to a priority level for energy savings, the method comprising:
   transmitting, to the radio base station, an indicator of a priority level for energy savings, thus allowing the radio base station to configure a parameter related to the user equipment so as to effect energy savings in the radio access network during the connection, according to the priority level; and
   applying, during the connection, the parameter configured by the radio base station.

2. The method of claim 1, wherein the indicator is transmitted during initial access of the connection, and the priority level is indicated in a random access preamble or a user equipment capability message.

3. The method of claim 1, wherein the indicator is transmitted after initial access of the connection, and the priority level is indicated in a medium access control (MAC) control element, a scheduling request, a buffer status report, or a quality of service parameter.

4. The method of claim 1, further comprising:
   detecting a trigger associated with a further priority level for energy savings in the wireless communications system, wherein the trigger is received via a user interface of the user equipment; and
   transmitting an indicator of the further priority level to the radio base station, allowing the radio base station to further effect energy savings in the radio access network during the connection according to the further priority level.

5. The method of claim 1, wherein the priority level corresponds to one of at least two pre-determined priority levels.

6. The method of claim 1, further comprising receiving information regarding the energy savings in the radio access network during the connection, from the radio base station.

7. The method of claim 1, wherein the priority level indicates a priority of energy savings in relation to any of a throughput, a delay, a priority, and a packet loss rate associated with the connection.

8. A method, in a radio base station in a wireless communications system that comprises a radio access network and one or more user equipments, for effecting energy savings in the wireless communications system during a connection between a user equipment and the radio base station according to a priority level for energy savings, the method comprising:
  retrieving an indicator of the priority level for energy savings in the radio access network; and
  configuring a parameter so as to effect energy savings in the radio access network during the connection according to the indicated priority level.

9. The method of claim 8, wherein the indicator is retrieved from the user equipment during initial access of the connection, and the priority level is indicated in a random access preamble or a user equipment capability message.

10. The method of claim 8, wherein the indicator is retrieved from the user equipment after initial access of the connection, and the priority level is indicated in a medium access control (MAC) control element, a scheduling request, a buffer status report, or a quality of service parameter.

11. The method of claim 8, wherein the indicator is retrieved from a network node during initial access of the connection, and the priority level is indicated in a user equipment subscription parameter.

12. The method of claim 8, further comprising:
  receiving an additional indicator of a further priority level for energy savings in the wireless communications system, from the user equipment; and
  configuring the parameter according to the indicated further priority level.

13. The method of claim 8, wherein the configured parameter is at least one of a user equipment related parameter and a radio access network related parameter.

14. The method of claim 8, wherein the priority level corresponds to one of at least two pre-determined priority levels.

15. The method of claim 8, further comprising transmitting information regarding the energy savings in the radio access network during the connection, to the user equipment.

16. The method of claim 8, wherein the priority level indicates a priority of the energy saving in relation to any of a throughput, a delay, a priority, and a packet loss rate associated with the connection.

17. A user equipment configured to be used in a wireless communications system that comprises a radio access network and one or more user equipments, wherein said user equipment is further configured to enable a radio base station to effect energy savings in the wireless communication system during a connection between the user equipment and the radio base station according to a priority level for energy savings, the user equipment comprising:
  a transmitter configured to transmit, to the radio base station, an indicator of the priority level for energy savings, allowing the radio base station to effect energy savings in the radio access network during the connection according to the priority level.

18. The user equipment of claim 17, wherein the transmitter is configured to transmit the indicator during initial access of the connection, and wherein the priority level is indicated in a random access preamble or a user equipment capability message.

19. The user equipment of claim 17, wherein the transmitter is configured to transmit the indicator after initial access of the connection, and wherein the priority level is indicated in a medium access control (MAC) control element, a scheduling request, a buffer status report, or a quality of service parameter.

20. The user equipment of claim 17, wherein the detecting unit is further configured to detect a trigger of a further priority level for energy savings in the wireless communications system, the additional trigger received via a user interface of the user equipment, and wherein the transmitting unit is further configured to transmit an indicator of the further priority level to the radio base station, allowing the radio base station to further effect energy savings in the radio access network during the connection according to the further priority level.

21. The user equipment of claim 17, wherein the priority level corresponds to one of at least two pre-determined priority levels.

22. The user equipment of claim 17, further comprising a receiver configured to receive information regarding the energy savings in the radio access network during the connection, from the radio base station.

23. The user equipment of claim 17, wherein the priority level indicates a priority of the energy savings in relation to any of a throughput, a delay, a priority, and a packet loss rate associated with the connection.

24. A radio base station configured to be used in a wireless communications system that comprises a radio access network and one or more user equipments, wherein said radio base station is further configured to effect energy savings in the wireless communications system during a connection between a user equipment and the radio base station according to a priority level for energy savings, the radio base station comprising:
  a retrieving unit configured to retrieve an indicator of the priority level for energy savings in the wireless communications system; and
  a configuring unit configured to configure a parameter so as to effect energy savings in the radio access network during the connection according to the indicated priority level.

25. The radio base station of claim 24, wherein the retrieving unit is configured to retrieve the indicator of the priority level from the user equipment during initial access of the connection, and wherein the priority level is indicated in a random access preamble or a user equipment capability message.

26. The radio base station of claim 24, wherein the retrieving unit is configured to retrieve the indicator from the user equipment after initial access of the connection, and wherein the priority level is indicated in a medium access control (MAC) control element, a scheduling request, a buffer status report, or a quality of service parameter.

27. The radio base station of claim 24, wherein the retrieving unit is configured to retrieve the indicator from a network node during initial access of the connection, and wherein the priority level is indicated in a user equipment subscription parameter.

28. The radio base station of claim 24, wherein the receiver is further configured to receive an additional indicator of a further priority level for energy savings in the wireless communications system, from the user equipment, and the configuring unit is further adapted to configure the parameter according to the indicated further priority level.

29. The radio base station of claim 24, wherein the parameter is at least one of a user equipment related parameter and a radio access network related parameter.

30. The radio base station of claim 24, wherein the priority level corresponds to one of at least two pre-determined priority levels.

31. The radio base station of claim 24, further comprising a transmitter configured to transmit information regarding energy savings in the radio access network during the connection, to the user equipment.

32. The radio base station of claim 24, wherein the priority level indicates a priority of the energy saving in relation to any of a throughput, a delay, a priority and a packet loss rate associated with the connection.

33. A method, in a user equipment in a wireless communications system that comprises a radio access network and one or more user equipments, for effecting energy savings in the radio access network during a connection between the user equipment and a radio base station according to a priority level for energy savings in the wireless communications system, the method comprising:
configuring a user equipment related parameter so as to effect energy savings in the radio access network during the connection according to the priority level; and
applying, during the connection, the user equipment related parameter.

34. The method of claim 33, wherein the user equipment related parameter is at least one of a parameter indicating a user equipment capability, and a parameter indicating supported radio access technologies.

35. The method of claim 33, wherein the priority level indicates a priority for energy savings in the wireless communications system in relation to any of a throughput, a delay, a priority, and a packet loss rate associated with the connection.

36. A user equipment configured to be used in a wireless communications system that comprises a radio access network and one or more user equipments, wherein said user equipment is further configured to effect energy savings in the radio access network during a connection between the user equipment and a radio base station according to a priority level for energy savings in the wireless communications system, the user equipment comprising:
a receiver configured to receive a trigger via a user interface of the user equipment, wherein the trigger is associated with the priority level; and
a configuring unit, configured to configure a user equipment related parameter so as to effect energy savings in the radio access network during the connection according to the priority level.

37. The user equipment of claim 36, wherein the user equipment related parameter is at least one of a parameter indicating a user equipment capability, and a parameter indicating supported radio access technologies.

38. The user equipment of claim 36, wherein the priority level indicates a priority of the energy saving in relation to any of a throughput, a delay, a priority, and a packet loss rate associated with the connection.

39. The method of claim 1, further comprising, prior to said transmitting, detecting a trigger received via a user interface of the user equipment, wherein the trigger is associated with the priority level for energy savings in the wireless communications system.

40. The method of claim 33, further comprising, prior to said configuring, detecting a trigger received via a user interface of the user equipment, wherein the trigger is associated with the priority level for energy savings in the wireless communications system.

\* \* \* \* \*